United States Patent
Hayashi et al.

(10) Patent No.: US 7,923,090 B2
(45) Date of Patent: Apr. 12, 2011

(54) OPTICAL INFORMATION RECORDING MEDIUM AND METHOD FOR MANUFACTURING THE SAME

(75) Inventors: Kazuhiro Hayashi, Osaka (JP); Keiji Nishikiori, Kyoto (JP); Sou Miyata, Chiba (JP)

(73) Assignee: Panasonic Corporation, Osaka (JP)

( * ) Notice: Subject to any disclaimer, the term of this patent is extended or adjusted under 35 U.S.C. 154(b) by 1223 days.

(21) Appl. No.: 11/547,265

(22) PCT Filed: Apr. 6, 2005

(86) PCT No.: PCT/JP2005/006778
§ 371 (c)(1),
(2), (4) Date: Oct. 4, 2006

(87) PCT Pub. No.: WO2005/098841
PCT Pub. Date: Oct. 20, 2005

(65) Prior Publication Data
US 2008/0285415 A1  Nov. 20, 2008

(30) Foreign Application Priority Data
Apr. 8, 2004 (JP) ................................. 2004-113788

(51) Int. Cl.
*B32B 3/02* (2006.01)
(52) U.S. Cl. ..................... 428/64.1; 428/64.4; 428/65.2; 430/270.1
(58) Field of Classification Search .................. None
See application file for complete search history.

(56) References Cited

U.S. PATENT DOCUMENTS

| | | | |
|---|---|---|---|
| 6,386,458 B1 | 5/2002 | Leiber et al. | |
| 2002/0075795 A1 | 6/2002 | Yamasaki et al. | |
| 2003/0003261 A1 * | 1/2003 | Saito et al. | 428/64.4 |
| 2005/0158500 A1 | 7/2005 | Kitano et al. | |

FOREIGN PATENT DOCUMENTS

| | | |
|---|---|---|
| CN | 1341927 | 3/2002 |
| EP | 1 187 118 | 3/2002 |
| GB | 2 236 009 | 3/1991 |

(Continued)

OTHER PUBLICATIONS

Chinese Office Action (with English translation) issued Nov. 7, 2008 in corresponding Chinese Patent Application No. 200580011938.2.

(Continued)

*Primary Examiner* — Elizabeth Mulvaney
(74) *Attorney, Agent, or Firm* — Wenderoth, Lind & Ponack, L.L.P.

(57) ABSTRACT

A transparent protective layer (106) having a thickness of 100 μm is formed of a resin film (100), a boundary layer (104) and an adhesive layer (103) on a signal recording layer (102). When $n_f$, $n_i$ and $n_a$ are the indices of refraction of the resin film (100), the boundary layer (104) and the adhesive layer (103), respectively, the relationship among $n_f$, $n_i$, and $n_a$ satisfies any one of the following equation: $n_a < n_i \leq n_f$; $n_a > n_i \geq n_f$; $n_a < n_f \leq n_i$; or $n_a > n_f \geq n_i$, and the relationship among $n_f$, $n_i$, and $n_a$ satisfies the following equation $|n_f - n_i| < |n_f - n_a|$. At this time, a protrusion (111) and a scratch (110) are optically buried within the boundary layer (104), reducing scattering of laser beams and disturbance in the wave front which occur in these portions, and thereby, the error rate can be reduced.

18 Claims, 5 Drawing Sheets

FOREIGN PATENT DOCUMENTS

| | | |
|---|---|---|
| JP | 11-86340 | 3/1999 |
| JP | 11-203726 | 7/1999 |
| JP | 11-306595 | 11/1999 |
| JP | 2001-84647 | 3/2001 |
| JP | 2001-243658 | 9/2001 |
| JP | 2002-260291 | 9/2002 |
| JP | 2003-22587 | 1/2003 |
| JP | 2003-507830 | 2/2003 |
| JP | 2003-173574 | 6/2003 |
| JP | 2004-62958 | 2/2004 |
| WO | 00/17864 | 3/2000 |
| WO | 03/076541 | 9/2003 |

OTHER PUBLICATIONS

Supplementary European Search Report (in English language) issued May 23, 2008.

* cited by examiner

OPTICAL INFORMATION RECORDING MEDIUM AND METHOD FOR MANUFACTURING THE SAME

TECHNICAL FIELD

The present invention relates to an optical information recording medium which is constituted from a transparent protective layer, a signal recording layer and a supporting substrate, in an order from a light incident side for recording and reproducing, where the thickness of the transparent protective layer is 10 µm to 200 µm, as well as to a manufacturing method of the same.

BACKGROUND ART

An optical information recording medium having a thin transparent protective layer of which the thickness is 0.1 mm on the recording and reproducing side using a violet laser light source (of which the wavelength is approximately 400 nm) and a lens with a high NA has been proposed as a high density optical information recording medium. Such a high density optical information recording medium has a structure where a guide groove or pits for signals are formed on the surface of a thick signal substrate, on top of this, a multi-layered recording film or a metal film which is rewritable is formed, and on top of this, a transparent protective layer is formed. As for the method for fabricating a transparent protective layer of an optical information recording medium having this structure, the following two methods can be cited.

(A) A transparent film is made to adhere to the surface of a signal substrate where a multi-layered recording film or a metal film has been formed in a guide groove or pits for signals with an adhesive, so that a transparent protective layer of which the total thickness is 0.1 mm is formed of the transparent film and the adhesive (see, for example, Japanese Patent Laid-open Publication No. 2002-184037).

(B) An ultraviolet ray curable resin in liquid form is applied to the surface of a signal substrate where a multi-layered recording film or a metal film has been formed in a guide groove or pits for signals, so as to have a thickness of 0.1 mm, and after that, is cured with ultraviolet rays, so that a transparent protective layer is gained (see, for example, Japanese Patent No. 3241560 (FIG. 4)).

According to method (B) between the above described two methods, precision in the thickness greatly depends on the precision in the application of the ultraviolet ray curable resin, while according to method (A), a film having high precision in the thickness can be used for most of the portion of the transparent protective layer where high precision in the thickness of no greater than 3 µm is required, and therefore, a transparent protective layer having high precision in the thickness of no greater than 2 µm, can be gained.

It is necessary to use a transparent film having high precision in the thickness when an optical information recording medium is manufactured according to the above described method (A). A film having high precision in the thickness can generally be gained according to a manufacturing method such as an extrusion method or die casting.

An extrusion method is a method for using a die of which the slit is adjusted so that a desired film thickness can be gained, and extruding a film material, such as melt plastic, from this slit. The film material that has been extruded from the die is cooled so as to become a film. In addition, die casting is a method for forming a film by melting a film material with a solvent and dropping the melt film material from a slit in the die in the same manner as in the extrusion method, and after that, volatilizing the solvent at a high temperature.

Though it is possible to implement high precision in the thickness of the fabricated film according to any manufacturing method for a film, there is a high possibility that defects such as unevenness or scratching will occur on the surface of the film during or after fabrication. Portions of a film rub against each other, for example, when the film is rolled up after fabrication, and thus, the surface is scratched, due to dust or other particles that has entered between the portions. Such scratching or unevenness may occur on either surface of the film.

In the case where an optical information recording medium with a transparent protective layer having a thickness of 0.1 mm for recording or reproducing using a lens with a high NA is fabricated using a film having scratches or unevenness, the scratches or the unevenness are located far away from the signal recording layer on the signal substrate (a multi-layered recording film or a metal film which is rewritable and is formed on a guide groove or pits) when the scratches or the unevenness are on the outside of the transparent protective layer (on the surface of the optical information recording medium). Therefore, the beam size of recording light or reproducing light is great when signals are recorded or signals are reproduced, and thus, the scratches or the unevenness barely affect the recording quality or the reproduced signals.

In the case where the scratches or the unevenness of the film are on the surface that makes contact with the adhesive, however, the scratches or the unevenness are located near the signal recording layer on the signal substrate, making the beam size of recording light or reproducing light small, and therefore, recording light and reproducing light are easily affected by the scratches or the unevenness. A phenomenon where, for example, the amount of light reduces due to scattering, or the function of stopping the beam deteriorates due to disturbance in the wave front occurs, causing the recording quality or the reproduced signals to deteriorate.

In view of the above described problem, an object of the present invention is to provide an optical information recording medium where the recording quality and the reproducing quality are excellent, even in the case where a transparent film having a defect, such as scratching or unevenness, is used as a portion of a transparent protective layer, and the thickness of the transparent protective layer is 10 µm to 200 µm.

SUMMARY OF THE INVENTION

In order to achieve the above described object, an optical information recording medium according to the first invention is an optical information recording medium includes a transparent protective layer, a signal recording layer and a supporting substrate. The respective layers are formed in this order from the light incident side for recording and reproducing, and the thickness of the transparent protective layer is 10 µm to 200 µm. The transparent protective layer is formed of at least a resin film and an adhesive layer for making the resin film stick to the signal recording layer, layered in this order, from the light incident side for recording and reproducing, and has a boundary layer between the resin film and the adhesive layer. According to the above described optical information recording medium of the first invention, effects of unevenness in the resin film can be suppressed by the boundary layer, and an increase in the error rate that occurs at the time of recording or reproducing can be prevented.

In the case where the height or depth of unevenness B, on the adhesive layer side, of the boundary layer that is formed over unevenness A on the surface of the resin film is approximately the same as the height or depth of the unevenness A, it is preferable when nf, na and ni are the index of refraction of the resin film, the index of refraction of the adhesive layer and the index of refraction of the boundary layer, respectively, for light having a wavelength in the vicinity of 405 nm, the relationship among nf, na and ni may satisfy the following equation na<ni<nf or na>ni>nf. In addition, it is preferable that the relationship among ni, na, and na may satisfy the following equation, such as ni=(nf+na)/2.

In addition, in the case where the height or depth of the unevenness B is smaller than the height or depth of the unevenness A, it is preferable when nf, na and ni are the index of refraction of the resin film, the index of refraction of the adhesive layer and the index of refraction of the boundary layer for light having a wavelength in the vicinity of 405 nm, the relationship among nf, na and ni may satisfy the following equation na<ni≦nf or na>ni≧nf.

In addition, in the case where no unevenness is formed on the surface of the boundary layer that makes contact with the adhesive layer due to the unevenness A, it is preferable that the relationship among na, ni, and nf may satisfy any one of the following equations:

na<ni≦nf;

na>ni≧nf;

$na < nf \leq ni$; and $ni - nf < nf - na$; or na>nf≧ni; and $nf - ni < na - nf$.

In the above described configuration, the difference in the index of refraction in the interface of the unevenness A or the unevenness B is reduced, or the height or depth of the unevenness is reduced in the interface having a difference in the index of refraction, and therefore, scattering of light in the unevenness is reduced, so that the error rate can be reduced.

It is preferable that the relationship among nf, na, and ni may satisfy the following equations |nf−na|>0.08 and |nf−ni|≦0.08. In this configuration, the effects of unevenness in the resin film can be reduced by means of the boundary layer. Concretely, in the case of 1.45≦nf≦1.65, it becomes possible to easily form a material for the resin film. It is preferable for the resin film to be made of a material that includes any of, for example, polycarbonate, an acrylic based resin, a polyolefin resin, a norbornene based resin and an epoxy resin. In addition, concretely, it is preferable for the adhesive layer to be made of a material of which the main component is either a radiation curable material or a pressure sensitive adhesive.

Furthermore, it is preferable for the main component of the boundary layer to be an inorganic material. Concretely, it is preferable for it to be a material which includes at least one of an oxygen compound, a nitrogen compound, a sulfur compound, a fluorine compound, a chlorine compound, a bromine compound and an iodine compound. The above described material can be easily formed as a boundary layer on a resin film according to a sputtering method, a deposition method, an ion plating method, and so on.

In addition, it is preferable for the main component of the boundary layer to be an organic material. Concretely, it is preferable for it to be a material which includes at least one of an acrylic based resin and an epoxy based resin. The above described material can be easily formed as a boundary layer on a resin film according to a printing technology, such as gravure printing or screen printing, or spin coating.

In order to achieve the above described object, an optical information recording medium according to the second invention is an optical information recording medium includes a transparent protective layer, a signal recording layer and a supporting substrate. The respective layers are formed in this order from the light incident side for recording and reproducing, and the thickness of the transparent protective layer is 10 μm to 200 μm. The transparent protective layer is formed of at least a resin film and an adhesive layer for making the resin film stick to the signal recording layer, layered in this order, from the light incident side for recording and reproducing, and when na and nf are the index of refraction of the adhesive layer and the index of refraction of the resin film, respectively, for light having a wavelength in the vicinity of 405 nm, the relationship between nf and na may satisfy the following equation |nf−na|≦0.08. According to the above described optical information recording medium of the second invention, the effects of unevenness of the resin film can be suppressed without a boundary layer, and the increase in the error rate that occurs at the time of recording or reproducing can be prevented.

In addition, it is preferable in the above described optical information recording medium of the second invention that the relationship between nf and na may satisfy the following equation |nf−na|<0.05. In this configuration, the difference in the index of refraction in the interface where unevenness exists can be reduced, and furthermore, the error rate can be reduced. Concretely, in the case of 1.45≦nf≦1.65, it becomes possible to easily form a material for the resin film. It is preferable for the resin film to be made of a material that includes any of, for example, polycarbonate, an acrylic based resin, a polyolefin resin, a norbornene based resin and an epoxy resin. In addition, it is preferable for the adhesive layer to be made of a material of which the main component is an organic material, and which includes at least one of an acrylic based resin and an epoxy based resin. Concretely, it is preferable for it to be made of a material of which the main component is either a radiation curable material or a pressure sensitive adhesive. In the above described configuration, the adhesive layer can be easily formed according to a printing technology, such as gravure printing or screen printing, or spin coating.

Furthermore, it is preferable for an optical information recording medium according to the first invention or the second invention to have an additional protective layer which is harder than the resin film on the side of the resin film from which light enters for recording and reproducing. In the above described configuration, unevenness, such as scratching, can be prevented from occurring on the surface of the resin film through which light enters, and thus, an increase in the error rate can be prevented.

In order to achieve the above described object, an optical information recording medium according to the third invention is an optical information recording medium which includes a transparent protective layer, a signal recording layer and a supporting substrate. The respective layers are formed in this order from the light incident side for recording and reproducing, and the thickness of the transparent protective layer is 10 μm to 200 μm. The transparent protective layer is formed of at least a protective layer, a resin film and an adhesive layer for making the resin film stick to the signal recording layer, layered in this order, from the light incident side for recording and reproducing, the protective layer is harder than the resin film, and the height or depth of unevenness D on the protective layer that is formed over unevenness C on the surface of the resin film is smaller than the height or depth of unevenness C. According to the above described optical information recording medium of the third invention, the surface of the resin film is protected by the protective layer that is harder than the resin film, and the unevenness on the surface of the resin film becomes smaller due to the protective layer, and therefore, the effects on recording and reproducing can be reduced.

In addition, in order to achieve the above described object, a manufacturing method for an optical information recording medium according to the first invention is a manufacturing method for an optical information recording medium includes a transparent protective layer, a signal recording layer and a supporting substrate. The respective layers are formed in this order from the light incident side for recording and reproducing, and the transparent protective layer is formed of a resin film layer, a boundary layer and an adhesive layer, layered in this order from the light incident side for recording and reproducing, and the thickness of the transparent protective layer is 10 μm to 200 μm. The method includes: a boundary layer forming step for forming a boundary layer on a resin film; and adhesion step for placing an adhesive layer between the boundary layer and the supporting substrate on which the signal recording layer has been formed, and making the boundary layer adhere to the supporting substrate in such a manner that the boundary layer and the signal recording layer face each other. According to the above described manufacturing method for an optical information recording medium of the first invention, an optical information recording medium made of a resin film layer, a boundary layer and an adhesive layer where the thickness of the transparent protective layer is 10 μm to 200 μm can be easily manufactured so that an optical information recording medium having a low error rate can be supplied.

In addition, it is preferable, in the above described manufacturing method for an optical information recording medium of the first invention, for the type, the thickness and the forming method of the boundary layer to be selected in the boundary layer forming step, on the basis of the height or depth of the unevenness after the height or depth of the unevenness on the resin film has been detected. In this configuration, a boundary layer which has an optimal index of refraction and thickness corresponding to the height or depth of the unevenness can be formed.

In addition, it is preferable for the boundary layer forming step to be a step for forming a boundary layer by applying a material for the boundary layer when the material is in liquid form or semi-solid form. In the above described configuration, the boundary layer can be easily formed. In addition, it is preferable in the boundary layer forming step for the material for the boundary layer to be applied according to any of a sputtering method, a vapor deposition method, an ion plating method and a CVD method. In the above described configuration, the boundary layer of an inorganic material can be easily formed.

In addition, it is preferable for the adhesion step to be a step for forming an adhesive layer on the boundary layer and making the boundary layer stick to a supporting substrate on which a signal recording layer has been formed. At this time, it is preferable to use a pressure sensitive adhesive or a radiation curable material for the adhesive layer. In the above described configuration, an adhesive layer having high precision in the thickness can be easily formed.

It is preferable for the manufacturing method for an optical information recording medium of the first invention to additionally have the step of punching out the resin film in a desired form. In the above described configuration, an optical information recording medium having a desired form can be manufactured.

EFFECTS OF THE INVENTION

According to the present invention, the effects of unevenness on the surface of the resin film which becomes the basic material for a transparent cover layer can be reduced, and a lower error rate can be gained. Therefore, it becomes possible to supply an optical information recording medium having a large and stable storing capacity.

BRIEF DESCRIPTION OF THE DRAWINGS

The present invention will become readily understood from the following description of preferred embodiments thereof made with reference to the accompanying drawings, in which like parts are designated by like reference numeral and in which:

FIGS. 4A, 4B1 and 4B2 are diagrams showing examples of the resin film inspecting step and the boundary layer forming step; and FIGS. 5A to 5C2 are diagrams showing examples of the adhesion step.

| DESCRIPTION OF THE REFERENCE NUMERALS AND SYMBOLS | |
|---|---|
| 100, 401, 402, 403 | resin films |
| 101, 530 | supporting substrates |
| 102, 540 | signal recording layers |
| 103, 506, 545 | adhesive layers |
| 104, 200, 220, 407, 408, 500 | boundary layers |
| 105 | optical information recording medium |
| 106 | transparent protective layer |
| 110 | scratch |
| 111 | protrusion |
| 210 | deep scratch |
| 211 | high protrusion |
| 213, 223 | recesses |
| 214, 224 | protrusions |
| 400 | unevenness measuring apparatus |
| 405 | boundary layer applying roller |
| 406 | boundary layer target |
| 410 | boundary layer determining means |
| 415 | database of boundary layer type/forming method |
| 505 | adhesive layer applying roller |
| 510 | resin film with boundary layer |
| 515 | adhesive layer protective film |
| 520 | resin film with boundary layer/adhesive layer |
| 525 | punching die |
| 527 | punched out resin film with boundary layer/adhesive layer |
| 541 | laminating roller |
| 550 | punched out resin film with boundary layer |
| A | interface |
| d, d1, d2 | depth |
| t, t1, t2 | height |

BEST MODE FOR CARRYING OUT THE INVENTION

In the following, embodiments of the present invention are described in detail in reference to the drawings.

First Embodiment

Figure 1A:
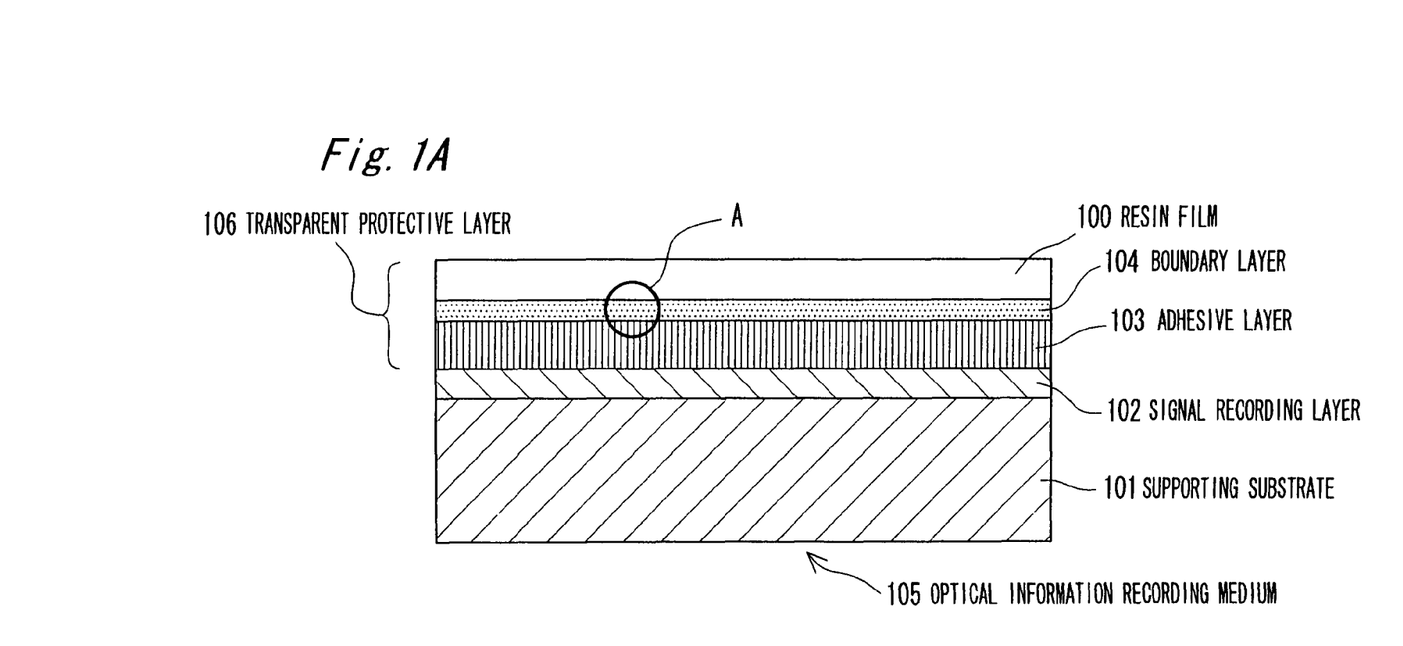
FIGS. 1A and 1B are schematic diagrams showing the structure of an optical information recording medium according to the present invention.
Figure 1B:
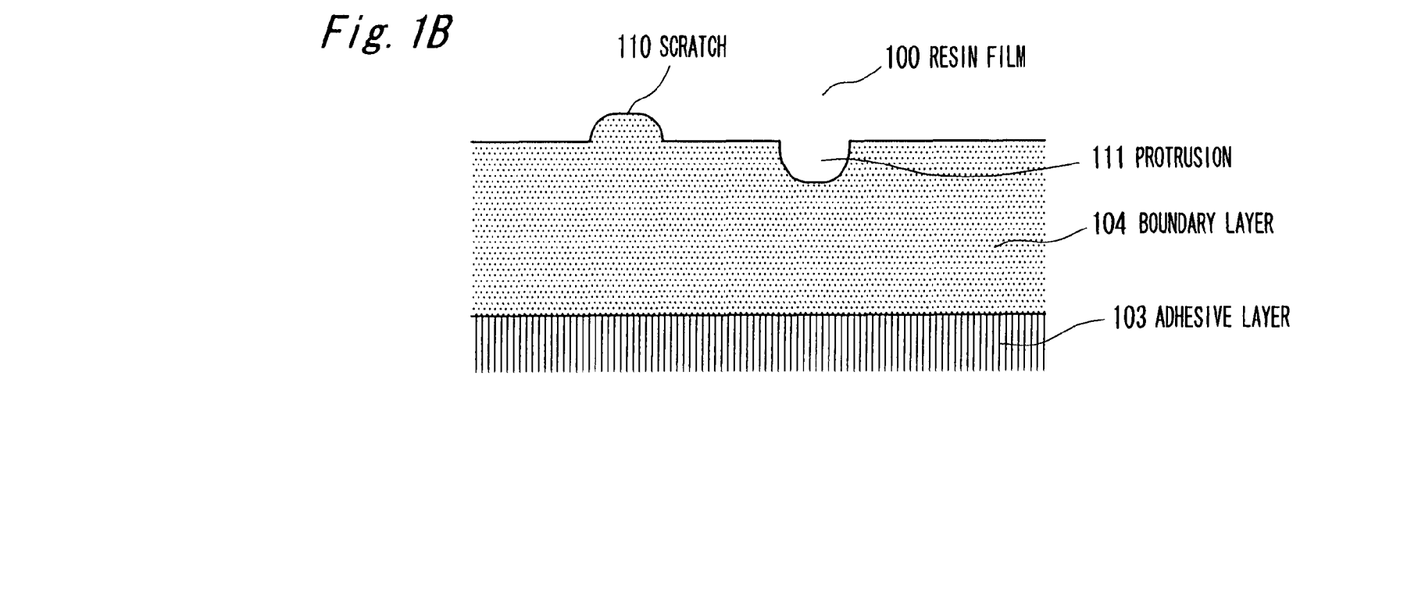

FIGS. 1A and 1B show an optical information recording medium according to an embodiment of the present invention. FIG. 1A is a diagram showing the structure of the optical information recording medium.

An optical information recording medium 105 is made of a supporting substrate 101, a signal recording layer 102 and a transparent protective layer 106. A laser beam enters from the transparent protective layer 106 side for recording and reproducing, so as to be condensed on the signal recording layer 102. The signal recording layer 102 is formed on the supporting substrate 101. Here, a guide groove or pits formed on the supporting substrate 101, together with a multi-layered recording film, a metal film or a pigment film which is rewritable and formed on top of the guide groove or pits, are referred to as signal recording layer. The supporting substrate 101 is fabricated according to an injection molding method or a 2P method using a plastic material, such as polycarbonate, an acrylic resin, a polyolefin resin or a norbornene based resin.

The transparent protective layer 106 having a thickness of 100 µm constituted by a resin film 100, a boundary layer 104 and an adhesive layer 103 is formed on the signal recording layer 102. In the optical information recording medium 105, a violet laser beam having a wavelength of 400 nm is condensed to a small beam with a lens with a high NA, such as 0.8 to 0.9, so that a recording mark is recorded or reproduced in or from the signal recording layer 102, or uneven pits are reproduced, and therefore, unevenness in the thickness of the transparent protective layer 106 greatly affects recording and reproducing quality. In the case where there is unevenness in the thickness of the transparent protective layer 106 which corresponds to 3% of the designed thickness, for example, 30 mλ of spherical aberration, which indicates the stop function of the beam that has been condensed on the signal recording layer 102 occurs, and thus, recording and reproducing quality deteriorates. Therefore, precision that is as high as ±3 µm relative to the thickness of 100 µm is required as the precision in the thickness of the transparent protective layer 106.

The resin film 100 can be formed according to a manufacturing method such as an extrusion method or die casting, of polycarbonate, an acrylic resin, a polyolefin resin, a norbornene based resin, an epoxy resin, a vinyl ester resin or the like. In the case where an extrusion method or a casting method is used, precision in the thickness, for example, of ±0.5 to 1 µm, can be achieved in the resin film 100 by itself.

The adhesive layer 103 is provided in order to make the resin film 100 having high precision in the thickness adhere to the signal recording layer 102. Concretely, an acrylic based or epoxy based ultraviolet ray curable resin or thermosetting resin, or a pressure sensitive adhesive can be cited as the adhesive. When an ultraviolet ray curable resin or a thermosetting resin in liquid form is used as the adhesive, the adhesive (having a viscosity of, for example, 500 mPa·s) is dropped between the resin film 100 having a precision of ±0.5 to 1 µm in the thickness, and the supporting substrate 101 on which the signal recording layer 102 has been formed and the whole is spun at a speed that is as high as 5000 rpm, and then, the thickness of the adhesive layer becomes 10 µm, and thus, precision of no greater than ±2 µm can be formed in the thickness of the transparent protective layer 106. In addition, when a pressure sensitive adhesive is used as the adhesive, precision that is higher than that when an ultraviolet ray curable resin or a thermosetting adhesive is used as described above can be formed. This is because application to the resin film 100, which is used as a base, according to a method such as gravure printing or screen printing is possible in the case of a pressure sensitive adhesive, due to the high viscosity. In this case, a transparent protective layer 106 having a precision of ±1.5 µm in the thickness can be formed, by using resin film 100 having a precision of ±0.5 to 1 µm in the thickness.

The boundary layer 104 is provided between the resin film 100 and the adhesive layer 103. FIG. 1B is an enlarged diagram showing a portion of interface A of FIG. 1A. As shown in FIG. 1B, the purpose of the boundary layer 104 is to bury a protrusion 111 and a scratch 110 on the surface of the resin film 100 on the adhesive layer 103 side, so as to reduce scattering of the laser beam and disturbance in the wave front that is caused in this portion. In order to achieve this, the index of refraction ni of the boundary layer 104 should be closer to the index of refraction nf of the resin film 100 than to the index of refraction na of the adhesive layer 103. That is to say, it is necessary for |nf−ni|<|nf−na| to be satisfied.

As for the material of the boundary layer 104, roughly classified, organic materials and inorganic materials can be cited. In either case, it is necessary to use a material of which the transmittance for light having a wavelength of 400 nm is high. In addition, an acrylic based resin an epoxy based resin and the like can be cited as the organic material. A material from among an acrylic based resin an epoxy based resin and the like, which are in liquid form or semi-solid form, or can be converted to solid form or a form that is closer to solid by means of heat or radiation (for example, ultraviolet rays) can be formed on the resin film 100 according to a method such as gravure plating, screen printing or spin coating, in the same manner as the application of the adhesive layer 103. As examples of such a material, an acrylic based ultraviolet ray curable resin and an epoxy based adhesive which are cured through a radical reaction or a cation reaction by means of ultraviolet rays can be cited. In addition, in the same manner as with the adhesive layer, a pressure sensitive adhesive that is formed by being mixed with a component having a high index of refraction can be utilized.

In addition, in the case where the boundary layer is made of an inorganic material, a dielectric substance, such as an oxygen compound, a nitrogen compound, a sulfur compound, a fluorine compound, a chlorine compound, a bromine compound and an iodine compound, for example, can be cited. In addition, it may be a material that includes any of these materials. By using such a dielectric substance, a film can be easily formed on the resin film 100 according to a method such as sputtering, vapor deposition, ion plating or CVD. In addition, a transparent inorganic material, which is not a dielectric material, can be formed as the boundary layer according to a method as that described above.

Figure 2A:
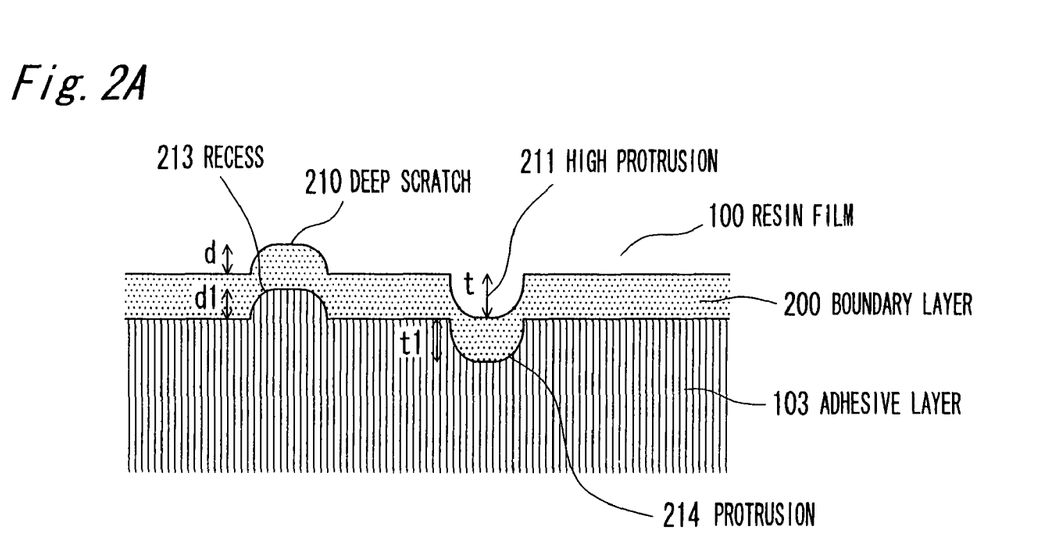
FIGS. 2A and 2B are schematic diagrams showing another example of the structure of an optical information recording medium according to the present invention.
Figure 2B:
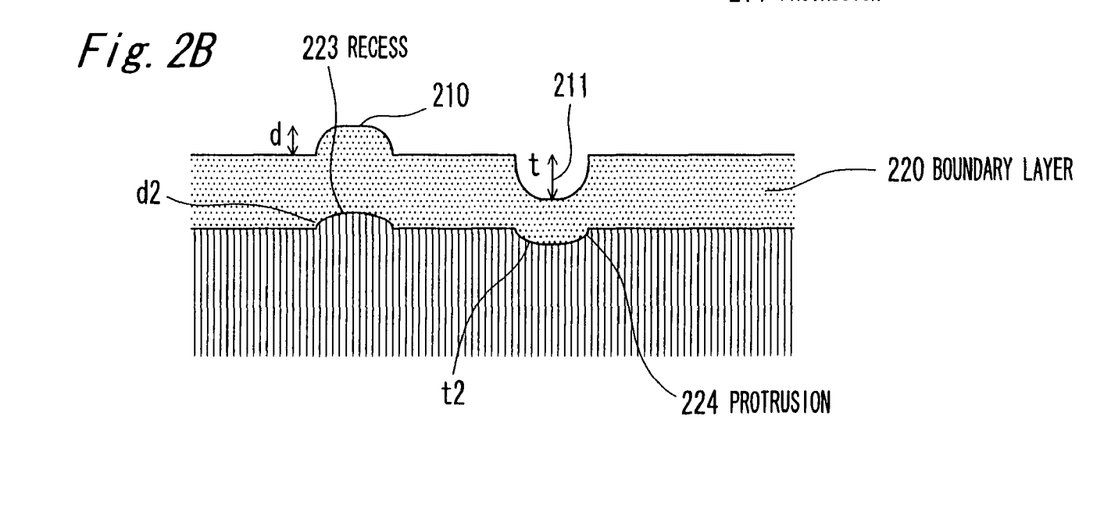

In the case where the depth of scratching and the height of protrusions on the resin film 100 is small, as shown in FIG. 1B, a scratch 110 and a protrusion 111 can sufficiently be buried in the thickness of the boundary layer 104. However, it is impossible to sufficiently bury a deep scratch 210 or a high protrusion 211, as shown in FIGS. 2A and 2B, in the thickness of a boundary layer 220. As examples of such a case, as shown in FIG. 2A, a recess 213 and a protrusion 214 are created in the boundary vis-à-vis the adhesive layer 103 as the result of the formation of a boundary layer 200, where the depth d1 and the height t1 of the recess and the protrusion are approximately the same as the depth d of the deep scratch 210 and the height t of the high protrusion 211, or as shown in FIG. 2B, the depth d2 and the height t2 of a recess 223 and a protrusion 224 which are created in the boundary vis-à-vis the adhesive layer 103 become small in comparison with the depth d of the deep scratch 210 and the height t of the high protrusion 211.

What is important here is to note that whichever the index of refraction, the index of refraction nf of the resin film or the index of refraction ni of the boundary layer, may be greater, as long as their values are close to each other in the case where the height or depth of the unevenness is small, as shown in FIG. 1B, so that they can be buried in the boundary layer, but it becomes necessary for a limitation in the size relationship between nf, ni and na to be added to the conditions where the values of the index of refraction nf of the resin film and the index of refraction ni of the boundary layer should be close to each other ($|nf-ni|<|nf-na|$), in such a case as that shown in FIGS. 2A and 2B.

That is to say, in a case as that shown in FIG. 1B, any relationship from among na<ni≦nf, na>ni≧nf, na<nf≦ni and na>nf≧ni may be satisfied, in addition to the relationship where the values of nf and ni are close to each other ($|nf-ni|<|nf-na|$), in order to make the effects of the scratches and protrusions on recording light and reproducing light (scattering or disturbance in the wave front) small. In the case of FIG. 2A, however, the value of ni may be between the values of na and nf, and na<ni<nf or na>ni>nf is preferable. This is because in the case of na<nf<ni or na>nf>ni, the difference between ni and na becomes great, making the protrusion 214 and the recess 213 cause scattering and disturbance in the wave front of recording light and reproducing light. In addition, in the case of FIG. 2B, the value of ni may be between the values of na and nf, and na<ni≦nf or na>ni≧nf is preferable. The depth d2 and the height t2 of the recess 223 and the protrusion 224 are small, and therefore, the effects of the protrusion 224 and the recess 213 on scattering and disturbance in the wave front of recording light and reproducing light can be sufficiently reduced, even in the case of ni=nf.

In the case where an inorganic material is used for the boundary layer, it is generally difficult to increase the thickness (because the rate of growth of the film is slow), and it is almost impossible to bury scratches and protrusions in the boundary layer, as shown in FIG. 1B, when the depth of the scratches or the height of the protrusions exceeds 0.3 μm, and thus, states as those shown in FIGS. 2A and 2B tend to be formed. Conversely, in the case where an organic material is used for the boundary layer, an increase in the thickness of the film can be achieved relatively easily, and therefore, it is possible to form any of the states of FIG. 1B, FIGS. 2A and 2B, by controlling the thickness. In the case of an organic material, for example, uneven portions are buried, as shown in FIG. 1B, when the height or depth is smaller than 5 μm.

Table 1 shows examples where resin films, adhesive layers and boundary layers are utilized, and the electric signal characteristics in each case.

TABLE 1

| | Resin Film | Boundary Layer (ni, di) | Adhesive Layer | Height or Depth of Unevenness/Difference in Index of Refraction | Bit Error Rate BER/Determination |
|---|---|---|---|---|---|
| Pattern A | PC-A | — | PSA-A | 3 μm/[0/0.10] | 2.0E−5/X |
| Pattern B | PC-A | — | DVD-003 | 3 μm/[0/0.8] | 1.5E−5/Δ |
| Pattern C | PC-B | — | PSA-A | 0.3 μm/[0/0.10] | 1.5E−5/Δ |
| Pattern D | PC-B | NdF3 (1.61, 50 nm) | PSA-A | 0.3 μm/[0/0.10] | 1.5E−5/Δ |
| Pattern E | PC-B | LiB3O5 (1.59, 50 nm) | PSA-A | 0.3 μm/[0.02/0.08] | 1.3E−5/○ |
| Pattern F | PC-B | SiO2-A (1.56, 50 nm) | PSA-A | 0.3 μm/[0.05/0.05] | 1.0E−5/○ |
| Pattern G | PC-B | NdF3 (1.61, 2 μm) | PSA-A | 0.1 μm/[0/0.10] | 9.2E−6/◎ |
| Pattern H | PC-B | SiO2 (1.54, 5 μm) | PSA-A | <30 nm/[0.07/0.03] | 1.3E−5/○ |
| Pattern I | PC-B | SiO2 (1.54, 5 μm) | DVD-003 | <30 nm/[0.07/0.01] | 1.1E−5/○ |
| Pattern J | PC-B | SiO2-B (1.57, 5 μm) | DVD-003 | <30 nm/[0.04/0.04] | 9.0E−6/◎ |
| Pattern K | PC-A | PSA-C (1.61, 10 μm) | DVD-003 | <30 nm/[0/0.08] | 6.4E−6/◎ |
| Pattern L | PC-A | PSA-B (1.56, 10 μm) | DVD-003 | <30 nm/[0.05/0.03] | 1.1E−5/○ |
| Pattern M | PC-B | Al2O3-A (1.68, 5 μm) | DVD-003 | <30 nm/[0.07/0.15] | 1.3E−5/○ |
| Pattern N | PC-B | Al2O3-B (1.69, 5 μm) | DVD-003 | <30 nm/[0.08/0.16] | 1.5E−5/Δ |

As for the boundary layer, the index of refraction ni and the thickness di for light having a wavelength of 405 nm are shown within parentheses. In addition, the height or depth of unevenness on the boundary layer due to protrusions and scratches on the surface of the resin film, as well as the difference in the index of refraction between the respective layers for each pattern are shown in the following manner: [index of refraction of resin film−index of refraction of boundary layer/index of refraction of boundary layer−index of refraction of adhesive layer].

As for the resin film, a polycarbonate film A (shown as PC-A in Table 1, thickness: 80 μm, 90 μm, index of refraction: 1.61) and a polycarbonate film B (shown as PC-B in Table 1, thickness: 80 μm, 85 μm, index of refraction: 1.61) were used. There were protrusions and scratches on the film surface of both polycarbonate films A and B. The height of the protrusions and the depth of the scratches were both no greater than 3 μm in the polycarbonate film A. In addition, the height of the protrusions and the depth of the scratches were both no greater than 0.3 μm in the polycarbonate film B.

In addition, as for the adhesive layer, two types, an ultraviolet ray curable resin DVD-003 (made by Nippon Kayaku Co., Ltd. viscosity: 450 mPa·s, index of refraction: 1.53) and a pressure sensitive adhesive A (shown as PSA-A in Table 1, thickness: 20 μm, 18 μm, 15 μm, index of refraction: 1.51) were used. As for the boundary layer, two types of organic materials in total, which are two types of pressure sensitive adhesives having different indices of refraction, a pressure sensitive adhesive B (shown as PSA-B in Table 1, thickness: 10 μm, index of refraction: 1.56) and a pressure sensitive adhesive C (shown as PSA-C in Table 1, thickness: 10 μm, index of refraction: 1.61), and seven types of inorganic compounds, $NdF_3$ (index of refraction: 1.61), $LiB_3O_5$ (index of refraction: 1.59), $SiO_2$ (index of refraction: 1.54), $SiO_2$-A matrix (index of refraction: 1.56), $SiO_2$-B matrix (index of refraction: 1.57), $Al_2O_3$-A matrix (index of refraction: 1.68) and $Al_2O_3$-B matrix (index of refraction: 1.69) were used. The boundary layer of the inorganic compounds was formed on the polycarbonate film A or B according to a sputtering method.

In addition, the pressure sensitive adhesives PSA-A, B and C were prepared as follows.

Preparation of PSA-A (index of refraction for light having a wavelength of 405 nm: 1.51)

97 weight parts of n-butyl acrylate, 3 weight parts of acrylic acid and 0.2 weight parts of azobisisobutyronitrile, as an initiator, were stirred in an ethyl acetate solvent for 17 hours at 60° C., and thereby, an acrylic ester copolymer solution having a weight average molecular weight of approximately 550,000 (Mw/Mn=5.0) was prepared. 12 weight parts of a xylene formaldehyde resin (made by Mitsubishi Gas Chemical Company, Inc.: Nikanol H-80) and 1.2 parts of a cross linking agent made of a polyisocyanate compound (made by Toyo Ink MFG. Co., Ltd.: Oribain BHS-8515) were added to 100 weight parts of the above described acrylic ester copolymer, which was distilled with methyl ethyl ketone so that the solid component became approximately 30 weight %, and thus, a pressure sensitive adhesive compound coating liquid was prepared.

Preparation of Psa-B (Index of Refraction for Light Having a Wavelength of 405 nm: 1.56)

97 weight parts of n-butyl acrylate, 3 weight parts of acrylic acid and 0.2 weight parts of azobisisobutyronitrile, as an initiator, were stirred in an ethyl acetate solvent for 17 hours at 60° C., and thereby, an acrylic ester copolymer solution having a weight average molecular weight of approximately 550,000 (Mw/Mn=5.0) was prepared. 130 weight parts of a xylene formaldehyde resin (made by Mitsubishi Gas Chemical Company, Inc.: Nikanol H-80) and 2.4 parts of a cross linking agent made of a polyisocyanate compound (made by Toyo Ink MFG. Co., Ltd.: Oribain BHS-8515) were added to 100 weight parts of the above described acrylic ester copolymer, which was distilled with methyl ethyl ketone so that the solid component became approximately 40 weight %, and thus, a pressure sensitive adhesive compound coating liquid was prepared.

Preparation of Psa-C (Index of Refraction for Light Having a Wavelength of 405 nm: 1.61)

97 weight parts of n-butyl acrylate, 3 weight parts of acrylic acid and 0.2 weight parts of azobisisobutyronitrile, as an initiator, were stirred in an ethyl acetate solvent for 17 hours at 60° C., and thereby, an acrylic ester copolymer solution having a weight average molecular weight of approximately 550,000 (Mw/Mn=5.0) was prepared. 260 weight parts of a xylene formaldehyde resin (made by Mitsubishi Gas Chemical Company, Inc.: Nikanol H-80) and 2.4 parts of a cross linking agent made of a polyisocyanate compound (made by Toyo Ink MFG. Co., Ltd.: Oribain BHS-8515) were added to 100 weight parts of the above described acrylic ester copolymer, which was distilled with methyl ethyl ketone so that the solid component became approximately 40 weight %, and thus, a pressure sensitive adhesive compound coating liquid was prepared.

A coating liquid that has been prepared in this manner was applied to the release processed surface of a release sheet (made by LINTEC Corporation: SP-PET3811) with a knife coater and dried for 1 minute at 90° C. so as to form an adhesive layer, and a resin sheet or a resin sheet with a boundary layer was stuck on the surface of this adhesive layer so that a transparent protective layer having a total thickness of 100 µm was formed, and thereby, PSA-A, B or C was fabricated.

The index of refraction can be changed by adjusting the amount of the xylene formaldehyde resin in the coating liquid. In the case of, for example, acrylic ester copolymer: xylene formaldehyde resin=100:36 as the weight ratio, the index of refraction becomes approximately 1.52, in the case of 100:88, the index of refraction becomes approximately 1.54, and in the case of 100:280, the index of refraction becomes approximately 1.62. In the case where the amount of mixture of the xylene formaldehyde resin is increased, cohesive power of the prepared PSA is lowered, making the PSA soft, and therefore, there is a risk that good sheet properties may not be prepared and the reflective film may corrode due to exuding of a low molecular component.

Accordingly, it is preferable for the amount of the xylene formaldehyde resin to be 10 weight parts to 280 weight parts relative to 100 weight parts of the acrylic ester copolymer, and it is more preferable for it to be 100 weight parts to 200 weight parts, taking the balance in the properties of the PSA into consideration.

In addition, though a xylene formaldehyde resin was used in order to increase the index of refraction according to the present embodiment, the additive is not limited to this, and resins that include a large amount of aromatic rings, halogen, sulfur or the like, may be used.

$SiO_2$-A or B matrix is a mixture where ZnS (index of refraction: 2.49) is dispersed in a base of $SiO_2$. $SiO_2$-A matrix is a mixture having a mol ratio of $SiO_2$:ZnS=98:2, and $SiO_2$-B matrix is a mixture having a mol ratio of $SiO_2$:ZnS=97:3. In addition, $Al_2O_3$-A or B matrix is a mixture where $SiO_2$ is dispersed in a base of $Al_2O_3$ (index of refraction: 1.71). $Al_2O_3$-A matrix is a mixture having a mol ratio of $Al_2O_3$: $SiO_2$=82:18, and $Al_2O_3$-B matrix is a mixture having a mol ratio of $Al_2O_3$:$SiO_2$=88:12.

Furthermore, in all of the cases, the thickness of the respective layers were set so that the total thickness of the transparent protective layer including the resin film, the boundary layer and the adhesive layer becomes approximately 100 µm.

As for the signal recording layer, a multi-layered recording film where a reflective film Ag, a dielectric layer ZnS—$SiO_2$, an interface layer, a recording film GeSbTe, an interface layer and a dielectric layer ZnS—$SiO_2$ are formed in this order in a guide groove having a track pitch of 0.32 µm and a depth of 20 nm was used. In addition, at the time of recording or reproducing, signals were recorded or reproduced in or from the guide groove (on the surface of a groove that is closer to the light incident side) with 5 mW in the case of recording and 0.4 mW in the case of reproduction, using an optical pick-up up with NA 0.85 for a violet laser having a wavelength of 405 nm. In addition, the length of the shortest mark was 0.149 µm, and the data transfer rate was 33 Mbps.

In the following, the results of the bit error rate when an optical information recording medium with a pattern of each combination is fabricated and recording and reproducing are carried out are shown. Here, in the case where the bit error rate is no greater than 1.5E-5, the bit error rate can be suppressed to a value that is no greater than 3.1E-4, where error can be corrected even when a reproducing electrical signal has deteriorated due to stress caused by warping or inconsistency in the precision of the thickness of the optical information recording medium or inconsistency in the lens stop of the optical pick-up. In addition, in the case where the bit error rate is smaller than 1.0E-5, mass production of the optical information recording medium can be guaranteed, even taking into account inconsistency, and thus, it can be the that mass production can be carried out stably.

In the following description, the polycarbonate films A and B are referred to as PC-A and PC-B, respectively, in the same manner as in Table 1. In addition, the bit error rate is referred to as BER.

In reference to Table 1, in the pattern A, there were protrusions and scratches of 3 µm in PC-A, and the index of refraction relative to the adhesive layer was as great as 0.1, and therefore, BER was 2.0E-5, which is very large. In addition, in the pattern B, though the index of refraction relative to the adhesive layer was 0.08, which is slightly smaller, BER was 1.5E-5, which is the level at which stress, such as that caused by warping or inconsistency in the thickness precision and optical pick-up, can somehow be born. In the pattern C, PC-B was utilized, and therefore, scratches and protrusions on the film were smaller than those in pattern A, while BER was approximately 1.5E-5.

In the pattern D, 50 nm of NdF3 having an index of refraction that is the same as that of PC-B was formed as the boundary layer, which is too thin to reduce unevenness in the boundary layer, as shown in FIG. 2A, and there was no optical difference with pattern C, and BER was 1.5E-5, which is the same as that of pattern C. In the pattern E, $LiB_3O_5$ was used instead of $NdF_3$. Therefore, the difference in the index of refraction vis-à-vis PC-B and PSA-A became as small as 0.02 and 0.08, in comparison with the patterns C and D (difference in the index of refraction on the uneven surface: 0.10), and BER was reduced to 1.3E-5, even when the degree of the unevenness in the boundary layer did not change. Furthermore, in the pattern F, $SiO_2$-A, of which the index of refraction is just between those of PC-B and PSA-A, was used, and therefore, BER was 1.0E-5, which is still smaller, in such a manner that stress, such as that caused by warping, inconsistency in the thickness precision of the optical information recording medium or inconsistency in the lens step of the optical pick-up can sufficiently be tolerated.

In the pattern G, $NdF_3$ was formed as the boundary layer so as to be as thick as 2 μm, in such a manner that protrusions and scratches of PC-B were buried, and the height or depth of the unevenness in the boundary layer was reduced to 0.1 μm, as shown in FIG. 2B. Therefore, BER can be greatly improved, in comparison with the pattern D, where the same material is used for the boundary layer, and 9.2E-6 was achieved.

Furthermore, in the patterns H to N, a further thicker boundary layer was formed, so that scratches and unevenness on the resin film were buried by the boundary layer, and thus, the state of FIG. 1B was prepared.

In the pattern H, a further thicker boundary layer was formed, using $SiO_2$. Here, the thickness was 5 μm. By doing so, protrusions and scratches of PC-B were completely buried, as shown in FIG. 1B, as a result, there was almost no unevenness in the boundary between the boundary layer and the adhesive layer. Accordingly, the unevenness of protrusions and scratches had a certain influence, with the index of refraction between the boundary layer and PC-B being 0.07. Therefore, BER also became 1.3E-5, which is smaller than 1.5E-5, as a result of the reduction in the difference in the index of refraction from 0.10 to 0.07, in comparison with the pattern C having no boundary layer. When, the protrusions or the unevenness on PC-B were approximately 0.3 μm, BER tended to become smaller than 1.5E-5, in the case where the difference in the index of refraction between the resin film and the boundary layer was no greater than 0.07. In the pattern I, in the same manner as in the pattern H, the difference in the index of refraction vis-à-vis PC-B was 0.07. In this case also, BER became 1.1E-5, which has more margin than 1.5E-5. Furthermore, in the pattern J, the difference in the index of refraction vis-à-vis PC-B became 0.04, which is further smaller, in comparison with the pattern I, and therefore, the optically effects of the scratches and protrusions on PC-B were reduced, and BER became 9.0E-6, which is smaller.

In the pattern K, 10 μm of PSA-C having the same index of refraction as PC-A was formed as the boundary layer. Therefore, the optical effects were completely nullified, in spite of deep scratches and high protrusions in PC-A, and a very small BER of 6.4E-6 was gained. In the pattern L, PSA-B, of which the index of refraction is 1.56, was used for the boundary layer, making the difference in the index of refraction vis-à-vis PC-A as great as 0.05. Therefore, BER was 1.1 E-5.

In the patterns M and N, a thick boundary layer having an index of refraction that is higher than that of the resin film was formed. In the pattern M, of which the difference in the index of refraction vis-à-vis PC-B, which is a resin film, is 0.07, BER was 1.3E-5, while in the pattern N, of which the difference in the index of refraction is 0.08, BER was 1.5E-5, which is greater. Here, in the case where the difference in the index of refraction is smaller than 0.08, a good tendency was gained.

As described above, it can be seen from the variety of combinations that, in the case where the difference in the index of refraction is no greater than 0.08 in the boundary having unevenness, BER that is no greater than 1.5E-5 is gained and stress, such as that caused by warping or inconsistency in the thickness precision of the optical information recording medium or inconsistency in the lens stop of an optical pick-up can be tolerated. In addition, it can also be seen that in the case where unevenness in the resin film does not change through the formation of the boundary layer, it is appropriate to use a boundary layer having an index of refraction which is just between those of the resin film and the adhesive. As described above, the material of the boundary layer having a certain index of refraction and thickness is selected on the basis of the depth of scratches and the height of protrusions of the resin film, and thereby, the optical effects (scattering, disturbance in the wave front and the like) can be reduced, BER can be suppressed, stress, such as that caused by warping or inconsistency in the thickness precision of the optical information recording medium or inconsistency in the lens stop of an optical pick-up can be tolerated, and a sufficient mass production margin can be gained.

Here, though in the first embodiment, a case of nf>na, where polycarbonate is used for the resin film and a pressure sensitive adhesive or an ultraviolet ray curable resin is used as the adhesive layer, is described, the same effects can be gained by forming the boundary layer of a variety of materials of a variety of thicknesses in the case of nf<na, where a PMMA film (index of refraction: 1.51) and PSA-C, for example, are used. In addition, as the boundary layer, though a fluorine compound, an oxygen compound or a sulfur compound of ZnS, which is a mixed material, were used herein, the material is not limited to these, and compounds such as nitrogen compounds, sulfur compounds, chlorine compounds, bromine compounds and iodine compounds, as well as inorganic compounds that contain these, can be cited as other examples. In addition, the organic material that is used as the boundary layer is not limited to that used in the present embodiment, and any material having an index of refraction and transparency which are at approximately the same level as the material used in the present embodiment may be used.

Furthermore, as for the resin film, it can be the that there are a great number of industrial plastic materials having an index of refraction of 1.45 to 1.65 that can be easily converted into films. Acrylic based resins, such as PMMA, polyolefin resins, norbornene based resins, epoxy resins and the like can be cited as examples.

Second Embodiment

According to the present embodiment, unlike in the first Embodiment, a case where an optical information recording medium is fabricated using only a resin film and an adhesive layer is described. (Table 2) shows combinations of a resin film and an adhesive layer and the electrical signal properties in each case. In addition, indices of refraction nf and ni for light having a wavelength of 405 nm of a resin film and an adhesive layer, respectively, as well as a difference in the index of refraction between those of the resin film and the adhesive layer for each pattern, are also shown.

TABLE 2

|  | Resin Film (nf) | Adhesive Layer (na) | Difference in Index of Refraction between Resin Film and Adhesive Layer | Bit Error Rate BER/Evaluation |
| --- | --- | --- | --- | --- |
| Pattern O | PC-A (1.61) | PSA-A (1.51) | 0.10 | 2.0E−5/X |
| Pattern P | PC-A (1.61) | DVD-003 (1.53) | 0.08 | 1.5E−5/Δ |
| Pattern Q | PC-A (1.61) | PSA-B (1.56) | 0.05 | 1.0E−5/○ |
| Pattern R | PC-A (1.61) | PSA-C (1.61) | 0 | 6.0E−5/◎ |
| Pattern S | PMMA (1.51) | PSA-C (1.61) | 0.10 | 2.0E−5/X |
| Pattern T | PMMA (1.51) | PSA-B (1.56) | 0.05 | 1.1E−5/○ |
| Pattern U | PMMA (1.51) | PSA-A (1.51) | 0 | 6.1E−5/◎ |

As for the resin film, a polycarbonate film A (shown as PC-A in (Table 2), thickness: 80 μm, index of refraction nf: 1.61) and a PMMA film (shown as PMMA in (Table 2), thickness: 80 μm, index of refraction nf: 1.51) were used. There were protrusions and scratches having a height or depth of no greater than 3 μm on the surface of both the polycarbonate film A and the PMMA film.

In addition, as the adhesive layer, a total of 4 types of adhesive layers, an ultraviolet ray curable resin DVD-003 (viscosity: 450 mPa·s, index of refraction: 1.53) made by Nippon Kayaku Co., Ltd., a pressure sensitive adhesive A (shown as PSA-A in Table 1, thickness: 20 μm, index of refraction: 1.51), a pressure sensitive adhesive B (shown as PSA-B in Table 1, thickness: 20 μm, index of refraction: 1.56) and a pressure sensitive adhesive C (shown as PSA-C in Table 1, thickness: 20 μm, index of refraction: 1.61) were used. In the case of DVD-003, spin coating is carried out in order to gain a given distribution in the thickness of 20 μm, by controlling the number of revolutions and the time for revolution so that the adhesive layer is stuck to the film within a vacuum chamber and cured by means of ultraviolet rays. In all cases, the total thickness of the transparent protective layer, including the resin film and the adhesive layer, was approximately 100 μm.

In addition, as for the signal recording layer, a guide groove and a multi-layered recording film which are the same as those of the first embodiment were used. Therefore, the descriptions thereof are herein omitted. The conditions for recording and reproducing were also the same as those of the first embodiment.

In the following description, the polycarbonate A and the PMMA film are referred to as PC-A and PMMA, respectively, in the same manner as in Table 2. In addition, the bit error rate is referred to as BER.

In the pattern O, the difference in the index of refraction between the resin film and the adhesive layer was 0.10, and therefore, the scratches or protrusions on the resin film on the adhesive layer side had a certain influence, and BER was 2.0E-5, which is very large.

In the pattern P, where DVD-003 was used as the adhesive layer, the difference in the index of refraction was reduced to 0.08, and therefore, BER was 1.5E-5, providing a state where correction of errors is possible, even when electrical signals have deteriorated due to stress, such as that caused by warping or inconsistency in the thickness precision of the optical information recording medium or inconsistency in the lens stop of an optical pick-up. Furthermore, in the patterns Q and R, where the index of refraction of the adhesive layer was 1.56 or 1.61, which is close to PC-A, and the difference in the index of refraction was 0.05 or 0, which is much smaller, better BER's of 1.0E-5 and 6.0E-6 were gained, providing an optical information recording medium having a mass production margin.

In the case (patterns S, T and U), where PMMA was used for the resin film, the index of refraction of the adhesive layer tended to be greater than that of the resin film which was made of PMMA. However, in the same manner as in patterns O to R, results depending on the difference in the index of refraction vis-à-vis the PMMA were gained, where BER becomes smaller as the difference in the index of refraction becomes smaller.

As described above, it can be seen from the results of (Table 2), in the same manner as with the results of (Table 1), that in the case where the difference in the index of refraction in the boundary having unevenness is no greater than 0.08, BER which is smaller than 1.5E-5 is gained, and stress, such as that caused by warping or inconsistency in the thickness precision of the optical information recording medium or inconsistency in the lens stop of an optical pick-up can be tolerated. In addition, it can be seen that in the case where the difference in the index of refraction is smaller than 0.05, an optical information recording medium having a sufficient mass production margin can be formed.

Here, in the second embodiment, though only examples for two types of resin films and four types of adhesive layers are described, the same effects can be gained using any of a variety of organic adhesives for the adhesive layer, by taking the difference in the index of refraction into consideration for a variety of resin films. An epoxy based adhesive, for example, can be used for the adhesive layer. As for the resin film, there are a large number of industrial plastic materials having an index of refraction of 1.45 to 1.65 which can be easily converted to a film. Polyolefin resins, norbornene based resins and epoxy resins can be cited as examples.

In addition, though this is described in neither of the first or second embodiments, a protective layer which is harder than the resin film may further be provided to the side of the resin film from which light enters for recording and reproducing. There is some unevenness, such as scratching and protrusions on the surface of the resin film on the side from which light enters for recording and reproducing. This unevenness is located far away from the signal recording layer, and therefore, the degree of unevenness is small, in comparison with the size of the spot of light for recording or reproducing, and affects recording and reproducing less than the unevenness in the interface vis-à-vis the boundary layer. The main role of this protective layer is to suppress an increase in the error rate resulting from scratches that are newly caused on the surface of the optical information recording medium. However, as for the unevenness on the surface on the light incident side for recording and reproducing, the height or depth of this unevenness in the resin film can be reduced through the formation of the protective layer, and in addition, the error rate can be reduced. The degree of this unevenness is very small, in comparison with the size of the spot of light for recording or reproducing, and therefore, it can be the that there is almost no limitation in the index of refraction of the protective layer. Therefore, many materials which may be inorganic materials or organic materials (for example, a hard coating agent and an organic material where inorganic fillers, such as silica having a high degree of hardness, are dispersed) can be used, as long as they are harder than the resin film and transparent. It is possible to coat an organic material in liquid form, and it is also easy to reduce the height or depth of unevenness or bury the unevenness. Furthermore, a protective layer on the resin film has the same effects also in the case of an optical information recording medium having no boundary layer.

Third Embodiment

Figure 3:
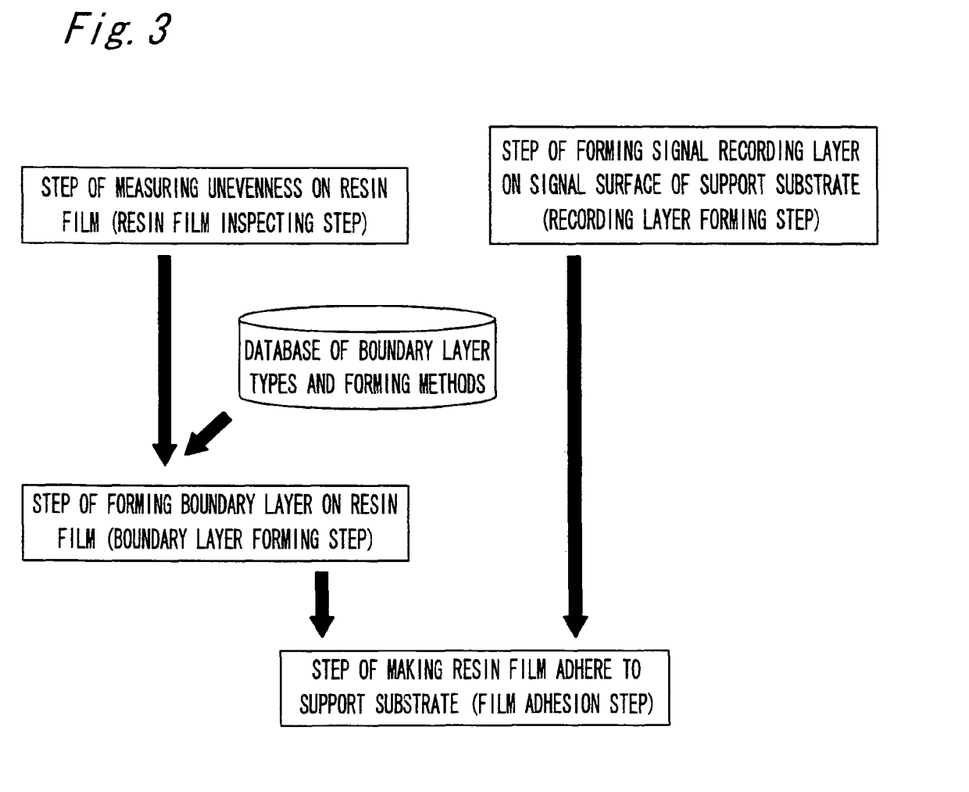
FIG. 3 is a block diagram showing a manufacturing method for an optical information recording medium according to the present invention.

In a third embodiment, an example of a manufacturing method for an optical information recording medium is described. FIG. 3 is a block diagram showing the steps of this manufacturing method. First, unevenness such as scratches and protrusions on the surface of a resin film which becomes the base material of a transparent cover layer is inspected and measured. This is referred to as the resin film inspecting step. Here, both surfaces of a resin film may be inspected or only one surface on which an adhesive layer is formed may be inspected. In the case where both surfaces of a resin film are inspected, the degree of unevenness, the height of protrusions and other quantities on each surface are measured as statistics, and the surface which seems to be less affected by the unevenness may be selected on the basis of this statistic as the surface on which an adhesive layer is formed.

The type and the forming method of the boundary layer are determined on the basis of the results of the resin film inspecting step in reference to the database of the boundary layer type/forming method. Next, the boundary layer forming step is carried out where the determined boundary layer is formed on a resin film having unevenness. In parallel with this, the step of forming a signal recording layer on the signal surface of a support substrate having a guide groove or pits is carried out. Here, signals such as a guide groove or pits, and a multi-layered recording film and a reflective film which are formed on top of the signals are on the whole referred to as the signal recording layer.

In the case of an optical information recording medium for recording and reproducing, a multi-layered recording film where a reflective film Ag, a dielectric layer ZnS—SiO$_2$, an interface layer, a recording film GeSbTe, an interface layer and a dielectric layer ZnS—SiO$_2$ are formed in this order starting from the support substrate side, and a write-once read-multiple type film where a reflective film Ag and a coloring film are formed in this order starting from the support substrate side can be cited. Each film in the multi-layered film and the Ag reflective film of the write-once read-multiple type film are usually formed according to a sputtering method. In addition, as for other methods, the formation is possible by means of vapor deposition or ion plating. The coloring film of the write-once read-multiple type film usually can be formed by spin coating and then drying a coloring matter that has been dissolved in a solvent. In addition, as for other methods, vapor deposition can be cited. In the case of a reproduction type optical information recording medium for reproducing only, a metal film such as aluminum, an alloy thereof, silver or an alloy thereof, is formed over pits on the support substrate according to a sputtering method.

Finally, a support substrate on which a signal recording layer has been formed and a resin film on which a boundary layer has been formed are made to adhere to each other by means of an adhesive. This is referred to as the adhesion step. The adhesive becomes a portion of the optical information recording medium as an adhesive layer as shown in FIGS. 1A and 1B. As for the adhesive, as described in the above Embodiments 1 and 2, pressure sensitive adhesives and radiation curable materials, including ultraviolet ray curable resins using a radical reaction or a cation reaction, and thermosetting resins can be cited as examples. When the adhesive step is finished, the optical information recording medium is completed. Other steps such as the initialization step are added to the recordable and reproducible media after the adhesion step. This is the outline of the manufacturing method of the present invention.

Figure 4A:
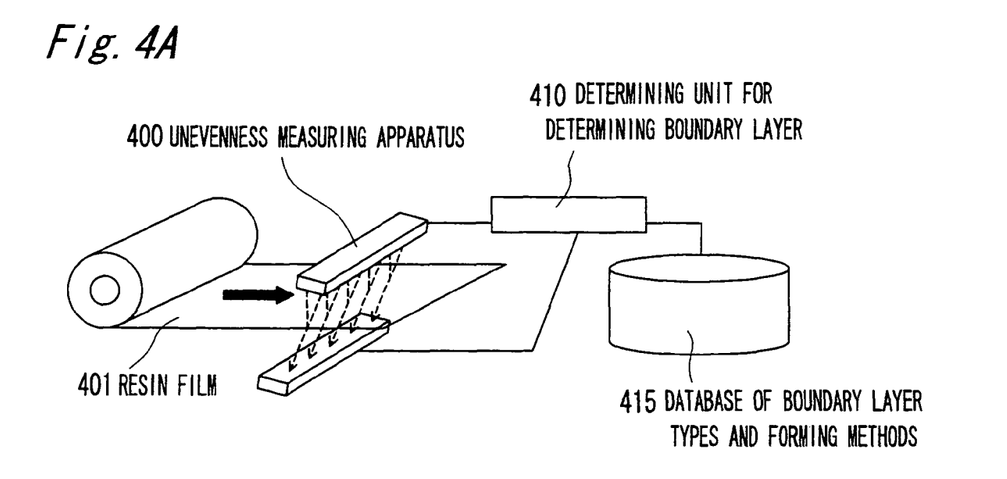

Next, in reference to FIGS. 4A, 4B1, 4B2, 5A, 5B, 5C1 and 5C2, each step in the manufacturing method shown in FIG. 3 is described in detail. FIG. 4A to 4B2 show the resin film inspecting step and the boundary layer forming step in detail. In addition, FIGS. 5A, 5B, 5C1 and 5C2 show the adhesive step in detail. Examples of the materials of the resin film, the boundary layer and the adhesive layer which are used in FIGS. 4A, 4B1, 4B2, 5A, 5B, 5C and 5C2 are shown in the above described Embodiments 1 and 2, and therefore, descriptions of these are hereinafter omitted.

FIG. 4A shows an example of an inspecting method in the resin film inspecting step. A resin film 401 in roll form is supplied to an inspecting device. The resin film 401 is extended from the roll so as to be inserted into an unevenness measuring apparatus 400. The unevenness measuring apparatus 400 optically detects unevenness in such a manner that the degree of the unevenness, whether it be the height or the depth of protrusions or scratches, can be measured by receiving light reflected (light scattered) from or light transmitted through the resin film. The unevenness measuring apparatus 400 is formed of a light source for measurement, a reflected light (scattered light) receiving element (for example, CCD), a transmitted light receiving element (for example, CCD) and the like. Though the wavelength of light for measurement can be selected depending on the degree of the unevenness whether it be the height or the depth of protrusions or scratches, it is preferable for the wavelength to be close to the wavelength (for example, a wavelength of 405 nm) of light for recording or reproducing of the optical information recording medium. This is because unevenness of which the degree affects the recording or reproducing can automatically be inspected when the inspection is carried out with light having a wavelength which is close to the wavelength of light for recording or reproducing.

It is also possible to simultaneously inspect unevenness on both surfaces of the resin film 401 by simultaneously detecting the light reflected (light scattered) from and the light transmitted through the unevenness. In addition, the intensity of the light reflected (light scattered) from and the light transmitted through the unevenness and the image of the unevenness are analyzed, and thereby, it can be determined which surface of the resin film 401 has the unevenness. The data that has been measured by the unevenness measuring apparatus 400 is transferred to a boundary layer determining means 410. The boundary layer determining means 410 determines an optimal boundary layer (material and thickness) and the forming method thereof on the basis of the information from database 415 of boundary layer types/forming methods. The database 415 of boundary layer types/forming methods stores information on materials for the boundary layer and the thicknesses and the forming methods which are appropriate for the respective types of materials as shown in Tables 1 and 2.

Figure 4B:
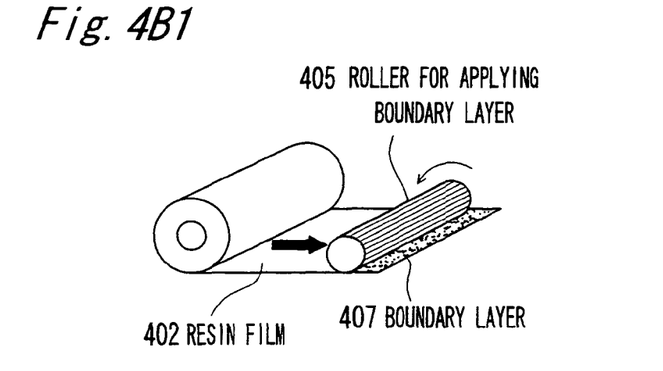
Figure 4B:
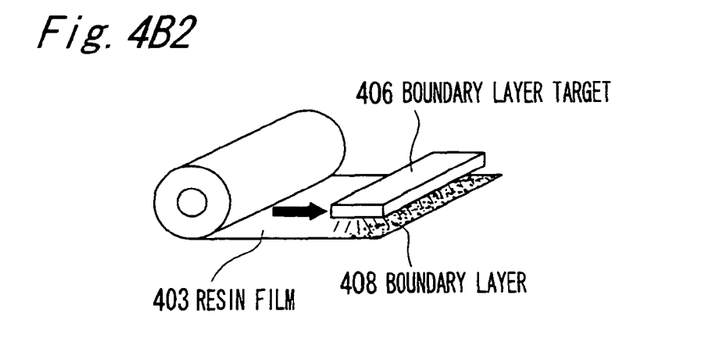

FIG. 4B1 shows an example of roll application which is one example of the boundary layer forming step. In addition, FIG. 4B2 shows an example of a sputtering method which is another example of the boundary layer forming step. The boundary layer of which the type and the forming method have been determined in FIG. 4A is formed according to a method as shown in FIGS. 4B1 and 4B2.

In the case where an organic material in liquid form or semi-solid form is used for the boundary layer, such as that shown in Table 1 and Table 2, the roller application of FIG. 4B1 is appropriate. A boundary layer 407 is formed on the surface of a resin film 402 to which the boundary layer is to be applied, by means of a boundary layer application roller 405. Here, though for the purpose of simplification, only the boundary layer application roller 405 is shown, a gravure roller for gravure printing may be used. In the case of a gravure roller, it is possible to make the application uniform in the thickness of the boundary layer. In the case where the boundary layer 407 is made of a radiation curable material or a thermosetting material, the boundary layer is cured through irradiation (for example, ultraviolet rays) or through heating after application. In addition, in the case where the boundary layer 407 is made of a pressure sensitive adhesive, the solvent is vaporized through heating after application, and thereby, a pressure sensitive adhesive in semi-solid form is performed.

In addition, in the case where an inorganic material is used for the boundary layer, the sputtering method of FIG. 4B2 is appropriate. A boundary layer 408 is formed on the surface of a resin film 403 to which a boundary layer is to be applied, by means of sputtering using a boundary layer target 406. The boundary layer target 406 is placed within a chamber in which a high degree vacuum is maintained, according to a sputtering method. In addition, the boundary layer target 406 may be a target made of the boundary layer 408 or a target for forming a boundary layer B in the case where the boundary layer 408 is formed through reaction with a gas. In the case where $SiO_2$ is used for the boundary layer, an $SiO_2$ target may be used, or a silicon target may be used and made to react with oxygen so as to form a boundary layer of $SiO_2$. As described above, a variety of forming methods can be used, depending on the material of the boundary layer.

Figure 5A:
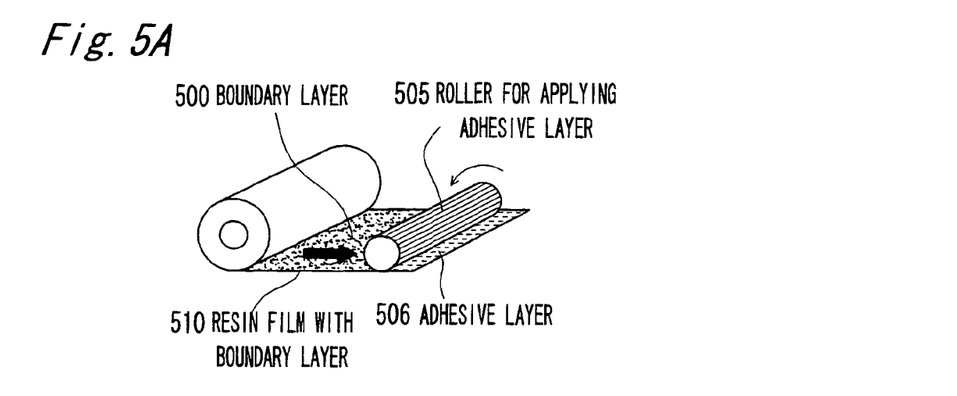
Figure 5B:
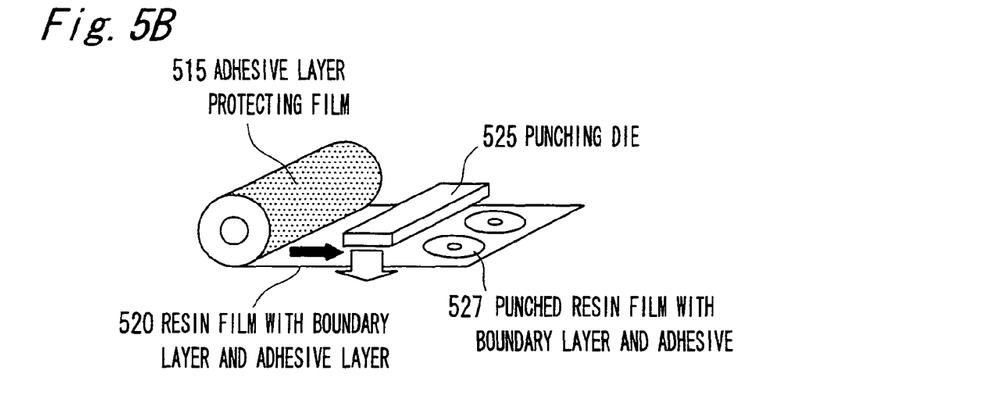

Next, FIGS. 5A to 5C2 show an example of the adhesion step. As shown in FIG. 5A, an adhesive layer 506 is formed on the surface, where a boundary layer 500 has been formed, of a resin film 510 with a boundary layer which has been formed according to the method of FIGS. 4A to 4B2. The material for the adhesive layer 506 is evenly applied by means of an adhesive layer application roller 505. A gravure roller may be used in the same manner as in FIG. 4B1. In the case where the adhesive layer 506 is made of a pressure sensitive adhesive, it is necessary to vaporize the solvent through heating after application. In addition, it is necessary to cover the adhesive layer with a protective film because of the viscosity after vaporization. In the case where the adhesive layer 506 is made of a radiation curable material, it is necessary to cover the adhesive layer with a protective film so that it is not irradiated after application. After that, as shown in FIG. 5B, a resin film 520 with a boundary layer and an adhesive layer that has been laminated with an adhesive layer protecting film 515 is punched out from the side on which the boundary layer or the adhesive layer is not formed, by means of a punching die 525, so that pieces in a form for optical information recording media are created. At this time, the resin film 527 with a boundary layer and an adhesive layer is punched out up to the adhesive layer, while the adhesive layer protecting film 515 is not punched out. Accordingly, the adhesive layer protecting film 515 can be easily handled as a base film.

Finally, as shown in FIGS. 5C1 and 5C2, the resin film is stuck to a support substrate 530 on which a signal recording layer 540 has been formed. In FIG. 5C1, the resin film 527 with a boundary layer and an adhesive layer that has been punched out in FIG. 5B is peeled from the adhesive layer protecting layer 515 so as to stick to the support substrate 530 by means of laminating roller 541 in such a manner that the adhesive layer makes contact with the surface of the signal recording layer 540 of the support substrate 530. It is preferable for the surface of the laminating roller 541 to be made of, for example, soft rubber, so that the resin film 527 with a boundary layer and an adhesive layer that has been punched out is not scratched when making contact with the laminating roller 541. In the case where the adhesive layer is made of a pressure sensitive adhesive, the method of FIG. 5C1 can be used. In addition, in the case where the adhesive layer is made of, for example, a material in liquid form (for example, an ultraviolet ray curable resin or the like), an adhesive layer application roller 505, such as that of FIG. 5A, is not utilized, but rather, an adhesive layer 545 is formed on the support substrate 530 through spin coating, as shown in FIG. 5C2, and on top of this, the resin film 550 with a boundary layer that has been punched out may be made to overlap and stuck in such a manner that the boundary layer and the adhesive layer 545 make contact with each other. After that, a process for curable (for example, irradiation with ultraviolet rays or heating) is carried out. At this time, the resin film 550 with a boundary layer is punched out according to a method as that shown in FIG. 5B. In addition, it is preferable to make the adhesive layer 545 and the boundary layer overlap in a vacuum chamber, so as to prevent air bubbles from being caught between the two. In addition, instead of spin coating, an adhesive in liquid form may be dropped in ring form onto the support substrate 530 or the resin film 550 with a boundary layer that has been punched out, and the two may be spun so as to expand the adhesive after the two have been made to overlap. In any case, the adhesive layer is formed with a controlled thickness, so that the transparent protective layer where the resin film, the boundary layer and the adhesive layer are layered has a desired thickness (for example, 100 μm).

According to a manufacturing method including the above described steps, an optical information recording medium having a boundary layer can be manufactured stably and with a short tact time.

Here, in the third embodiment, though an example of a manufacturing method including a resin film inspecting step is described, it is possible to omit the resin film inspecting step by using past data, in the case where the type and the thickness of the resin film, as well as the manufacturing method for the film are constant, so that the portions of the film surface where a high degree of unevenness occurs and the height or depth of the unevenness becomes approximately constant. In this case, the same type, thickness and forming method for the boundary layer can be used, and therefore, the entire process can be simplified.

In addition, in the resin film inspecting step, two inspections in total, one for each surface of the resin film, may be carried out, depending on the functions of the unevenness measuring apparatus.

In addition, in the case where the boundary layer is made of an organic material, a screen printing method may be utilized as a method other than that of FIG. 4B1. In the case where the boundary layer is made of an inorganic material, vapor deposition, ion plating or a CVD method may be utilized, in addition to the method of FIG. 4B2.

Figure 5C:
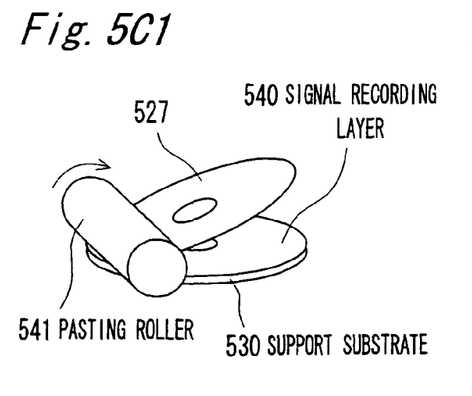
Figure 5C:
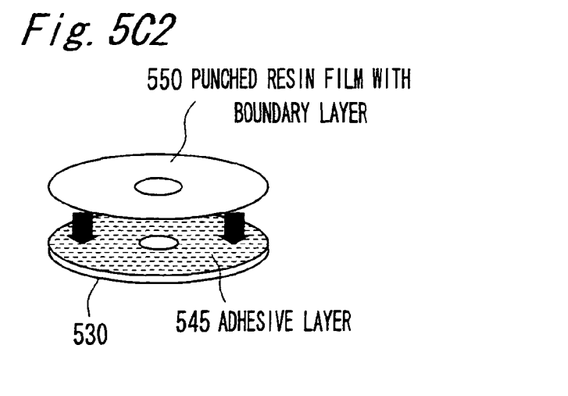

In addition, though a punching die is used in FIG. 5B, punching at a faster speed becomes possible when a rotary die in cylindrical form is used. The punching step may be carried out after the adhesion step. In this case, a resin film 520 with a boundary layer and an adhesive layer is stuck by means of a laminating roller 541, as shown in FIG. 5C1, after the application of an adhesive of FIG. 5A has been carried out, and after that, punching out is carried out. Here, in the third embodiment, though an example where circular forms are punched out is shown, the punched out form may be selected on the basis of the form of the support substrate or the desired form.

Furthermore, in the case where a protective layer that is harder than the resin film is additionally formed on the light incident side for recording and reproducing, a protective layer forming step is added, making the order of steps as follows.

(A) resin film inspecting step→boundary layer forming step of FIG. 4B1 or 4B2→adhesion step→protective layer forming step (B) resin film inspecting step→protective layer forming step→boundary layer forming step of FIG. 4B1 or 4B2→adhesion step Here, in the case of (A), the protective layer forming step becomes the final step, making the possibility of adhesion of dust or stains, or scratching on the surface of the resin film before the protective layer forming step high, and therefore, it is important to laminate the protective film in advance on the resin film 401. In addition, there is a possibility that measurement by means of this unevenness measuring apparatus 400 may become unstable, and therefore, the protective film may be laminated after the resin film inspecting step. An excellent surface of the protective layer can be formed when the protective layer is formed immediately after this protective film has been peeled off. As a result of this, new scratching can be prevented on the surface of the optical information recording medium, and thus, an increase in the error rate can be prevented.

INDUSTRIAL APPLICABILITY

An optical information recording medium according to the present invention can be used as a recording medium having a large and stable storing capacity, where the influence of unevenness on the surface of the resin film is reduced by the boundary layer, and therefore, signals can be recorded or reproduced without making the error rate increase.

In addition, a manufacturing method for an optical information medium according to the present invention can be used for the manufacture of an optical information recording medium as that described above, stably and for a short tact time.

The invention claimed is:

1. An optical information recording medium comprising:
a transparent protective layer;
a signal recording layer; and
a supporting substrate,
wherein the respective layers are formed in this order from the light incident side for recording and reproducing, and the thickness of the transparent protective layer is 10 µm to 200 µm,
wherein the transparent protective layer is formed of at least a resin film and an adhesive layer for making the resin film stick to the signal recording layer, layered in this order, from the light incident side for recording and reproducing, and the transparent protective layer has a boundary layer between the resin film and the adhesive layer,
wherein the resin film has unevenness A on the surface contacting the boundary layer, and accordingly, the boundary layer has unevenness B on the surface contacting the adhesive layer where the unevenness A is existing,
wherein the height or depth of the unevenness B is smaller than the height or depth of the unevenness A,
wherein the unevenness A has a height or depth ranging from 0.3 µm to 3 µm, and
when nf, na and ni represent index of refraction of the resin film, index of refraction of the adhesive layer and index of refraction of the boundary layer, respectively, the indices nf, na and ni satisfy the following equation:

$$na < ni \leq nf; \text{ or}$$

$$na > ni \geq nf,$$

and further satisfy the following equations:

$$|nf-ni| \leq 0.08; \text{ and}$$

$$|ni-na| \leq 0.1.$$

2. The optical information recording medium according to claim 1, wherein the relationship among the nf, the na and the ni satisfies the following equation, ni=(nf+na)/2.

3. The optical information recording medium according to claim 1, wherein the relationship between the nf and the na satisfies the following equation |nf−na|>0.08.

4. The optical information recording medium according to claim 1, wherein the nf meets $1.45 \leq nf \leq 1.65$.

5. The optical information recording medium according to claim 4, wherein the resin film is made of a material that includes any of a polycarbonate, an acrylic based resin, a polyolefin resin, a norbornene based resin and an epoxy resin.

6. The optical information recording medium according to claim 1, wherein the adhesive layer is made of a material of which the main component is either a radiation curable material or a pressure sensitive adhesive.

7. The optical information recording medium according to claim 1, wherein the main component of the boundary layer is an inorganic material.

8. The optical information recording medium according to claim 7, wherein the inorganic material is a material which includes at least one of an oxygen compound, a nitrogen compound, a sulfur compound, a fluorine compound, a chlorine compound, a bromine compound and an iodine compound.

9. The optical information recording medium according to claim 1, wherein the main component of the boundary layer is an organic material.

10. The optical information recording medium according to claim 9, wherein the boundary layer is made of a material which includes at least one of an acrylic based resin and an epoxy based resin.

11. A manufacturing method for an optical information recording medium where a transparent protective layer, a signal recording layer and a supporting substrate are formed in this order from the light incident side for recording and reproducing, and the transparent protective layer is formed of a resin film, a boundary layer and an adhesive layer, layered in this order from the light incident side for recording and reproducing, and the thickness of the transparent protective layer is 10 μm to 200 μm, the method comprising:

forming the boundary layer on the resin film; and placing the adhesive layer between the boundary layer and the supporting substrate on which the signal recording layer has been formed, and making the boundary layer stick to the supporting substrate in such a manner that the boundary layer and the signal recording layer face each other, wherein the resin film has unevenness A on the surface contacting the boundary layer, and accordingly, the boundary layer has unevenness B on the surface contacting the adhesive layer where the unevenness A is existing, wherein the height or depth of the unevenness B is smaller than the height or depth of the unevenness A, wherein the unevenness A has a height or depth ranging from 0.3 μm to 3 μm, and when nf, na and ni represent index of refraction of the resin film, index of refraction of the adhesive layer and index of refraction of the boundary layer, respectively, the indices nf, na and ni satisfy the following equation:

$$na < ni \leq nf; \text{ or}$$

$$na > ni \geq nf,$$

and further satisfy the following equations:

$$|nf - ni| \leq 0.08; \text{ and}$$

$$|ni - na| \leq 0.1.$$

12. The manufacturing method for an optical information recording medium according to claim 11, wherein the type, the thickness and the forming method of the boundary layer are to be selected in the boundary layer forming step, on the basis of the height or depth of the unevenness A after the height or depth of the unevenness A on the resin film has been detected.

13. The manufacturing method for an optical information recording medium according to claim 11, wherein the boundary layer forming step is a step for forming the boundary layer by applying a material for the boundary layer when the material is in liquid form or semi-solid form.

14. The manufacturing method for an optical information recording medium according to claim 11, wherein, in the boundary layer forming step, the material for the boundary layer is formed by any of a sputtering method, a vapor deposition method, an ion plating method and a CVD method.

15. The manufacturing method for an optical information recording medium according to claim 11, wherein the adhesion step is a step for forming the adhesive layer on the boundary layer and making the boundary layer stick to the supporting substrate on which the signal recording layer has been formed.

16. The manufacturing method for an optical information recording medium according to claim 11, wherein, in the adhesion step, a pressure sensitive adhesive is used for the adhesive layer.

17. The manufacturing method for an optical information recording medium according to claim 11, wherein, in the adhesion step, a radiation curable material is used for the adhesive layer.

18. The manufacturing method for an optical information recording medium according to claim 11, further comprising punching out the resin film in a desired form.

* * * * *

UNITED STATES PATENT AND TRADEMARK OFFICE
CERTIFICATE OF CORRECTION

PATENT NO. : 7,923,090 B2
APPLICATION NO. : 11/547265
DATED : April 12, 2011
INVENTOR(S) : Kazuhiro Hayashi et al.

It is certified that error appears in the above-identified patent and that said Letters Patent is hereby corrected as shown below:

On the Title Page

Item (73), Assignee, "Panasonic Corporation, Osaka (JP)" should read --Panasonic Corporation, Osaka (JP); LINTEC Corporation, Tokyo (JP)--.

Signed and Sealed this
Twenty-first Day of June, 2011

David J. Kappos
*Director of the United States Patent and Trademark Office*